(12) United States Patent
Lee et al.

(10) Patent No.: US 12,510,930 B2
(45) Date of Patent: Dec. 30, 2025

(54) DISPLAY DEVICE

(71) Applicant: Samsung Display Co., LTD., Yongin-si (KR)

(72) Inventors: Kang Woo Lee, Seoul (KR); Young Do Kim, Suwon-si (KR); Hyun Seok Oh, Yongin-si (KR); Dong Hyeon Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 403 days.

(21) Appl. No.: 17/879,897

(22) Filed: Aug. 3, 2022

(65) Prior Publication Data

US 2023/0205273 A1    Jun. 29, 2023

(30) Foreign Application Priority Data

Dec. 29, 2021    (KR) .................. 10-2021-0190951

(51) Int. Cl.
| | |
|---|---|
| *G06F 1/16* | (2006.01) |
| *D03D 1/00* | (2006.01) |
| *D03D 15/283* | (2021.01) |
| *D03D 15/46* | (2021.01) |
| *D03D 15/547* | (2021.01) |
| *D03D 15/573* | (2021.01) |

(52) U.S. Cl.
CPC ............ *G06F 1/1652* (2013.01); *D03D 1/00* (2013.01); *D03D 15/283* (2021.01); *D03D 15/46* (2021.01); *D03D 15/547* (2021.01); *D03D 15/573* (2021.01); *D10B 2331/02* (2013.01); *D10B 2331/10* (2013.01)

(58) Field of Classification Search
None
See application file for complete search history.

(56) References Cited

U.S. PATENT DOCUMENTS

| | | | |
|---|---|---|---|
| 9,643,384 B2 | 5/2017 | Min | |
| 10,687,592 B2 * | 6/2020 | Weber | ............... G02B 6/001 |
| 11,398,607 B2 | 7/2022 | Lee et al. | |
| 11,449,095 B2 | 9/2022 | Lee | |
| 11,502,069 B2 | 11/2022 | Jung et al. | |
| 11,822,384 B2 | 11/2023 | Lee | |
| 2017/0095043 A1 | 4/2017 | Weber et al. | |
| 2020/0299471 A1 | 9/2020 | Hou et al. | |
| 2023/0041968 A1 | 2/2023 | Kim et al. | |

FOREIGN PATENT DOCUMENTS

| | | |
|---|---|---|
| KR | 20140003728 | 1/2014 |
| KR | 20150007572 A | 1/2015 |
| KR | 20150115122 | 10/2015 |

(Continued)

*Primary Examiner* — Shawn Mckinnon
(74) *Attorney, Agent, or Firm* — CANTOR COLBURN LLP

(57) ABSTRACT

A stretchable window includes: a first material extending in a first direction and a second material extending in a second direction that intersects the first direction. The first material and the second material are interwoven, the first material has a first modulus, and the second material has a second modulus. The first modulus has a value in a range of about 0.1 Mpa to about 500 Mpa and the second modulus has a value in a range of about 1 Gpa to about 50 Gpa.

22 Claims, 18 Drawing Sheets

(56) References Cited

FOREIGN PATENT DOCUMENTS

| | | |
|---|---|---|
| KR | 20160015110 | 2/2016 |
| KR | 20190014185 A | 2/2019 |
| KR | 1020190138688 | 12/2019 |
| KR | 20210025417 | 3/2021 |
| KR | 20210086844 A | 7/2021 |
| KR | 20230023121 | 2/2023 |

* cited by examiner

FIG. 16
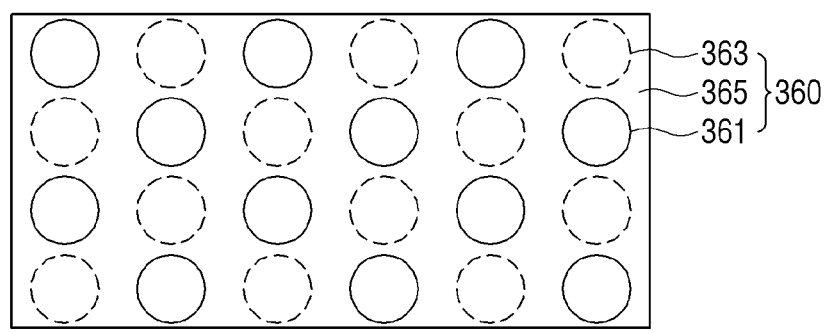
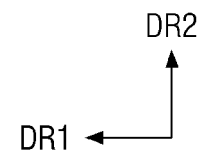
FIG. 17
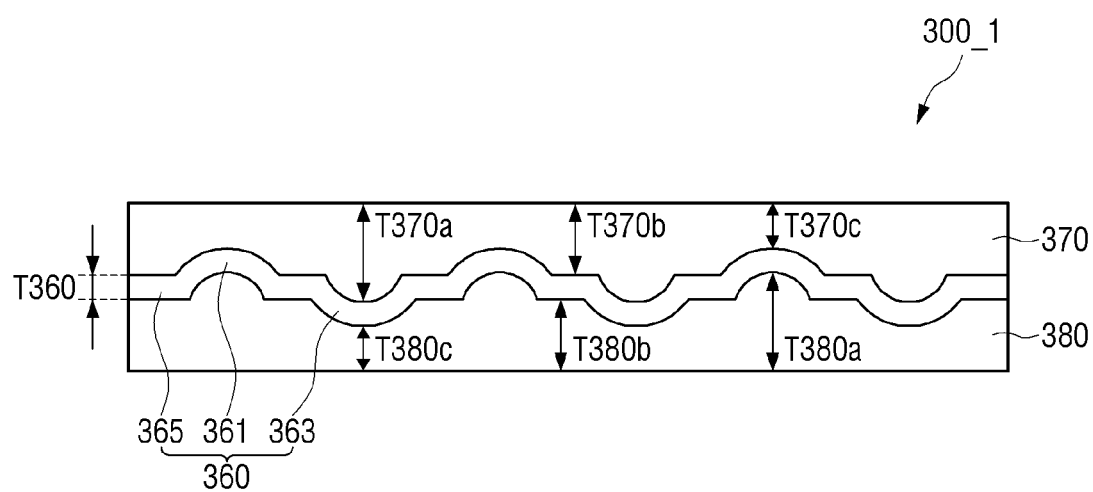

FIG. 18
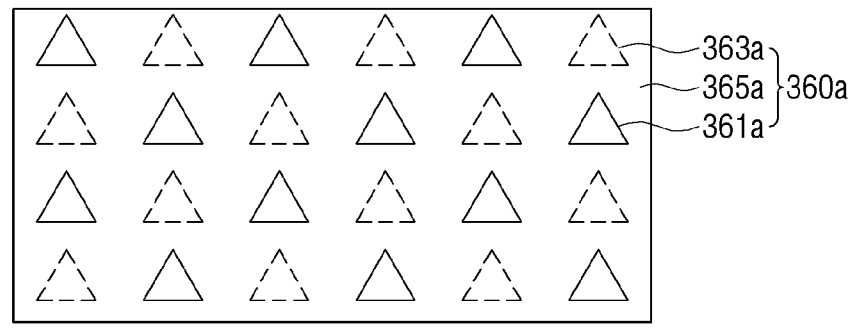
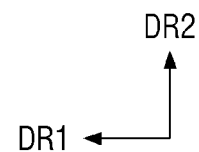
FIG. 19
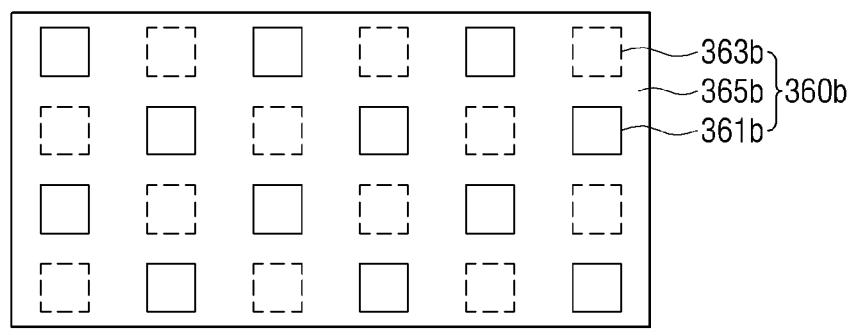
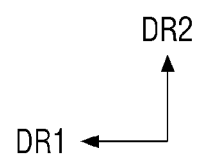

FIG. 20
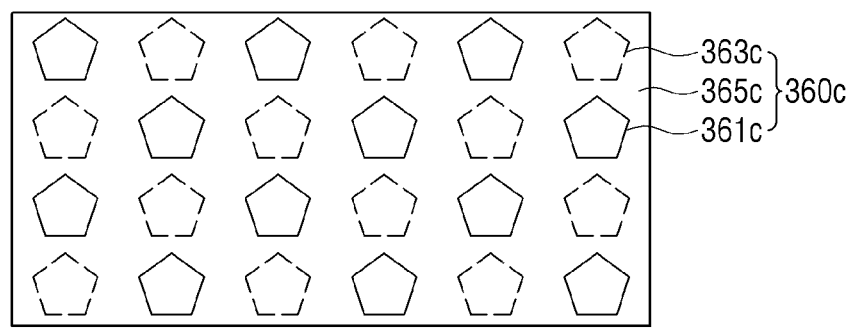
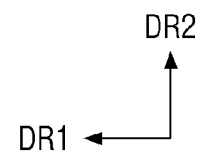
FIG. 21
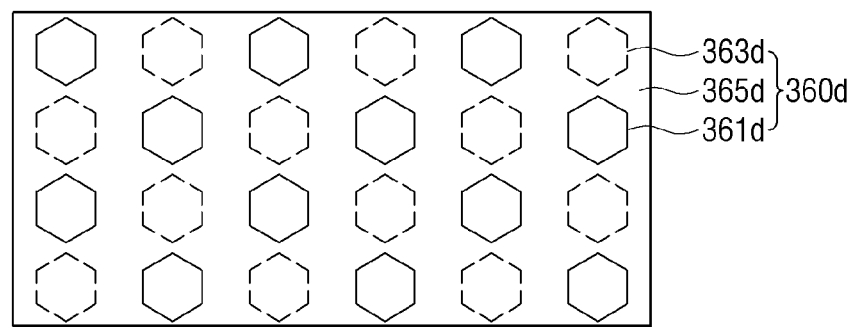
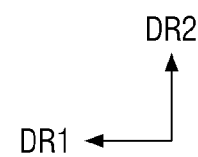

DISPLAY DEVICE

This application claims priority to Korean Patent Application No. 10-2021-0190951, filed on Dec. 29, 2021, and all the benefits accruing therefrom under 35 U.S.C. 119, the contents of which in its entirety are herein incorporated by reference.

BACKGROUND

1. Technical Field

The present disclosure relates to a display device.

2. Description of the Related Art

A display device may include a display panel and a cover window disposed on the display panel to protect the display panel from external forces.

A display panel may include a flexible display panel or a stretchable display panel. A cover window disposed on a flexible display panel or a stretchable display panel is bonded to the flexible display panel or stretchable display panel on the lower side thereof, and thus should have specifications similar to those of the flexible display panel or stretchable display panel. The specifications may be, for example, elongation rate and/or recovery rate.

The elongation rate of the stretchable display panel should be at least 20 percentages (%) or more. It is difficult to obtain the satisfactory elongation rate of the cover window on the stretchable display panel due to the material or the like.

SUMMARY

Aspects of the present disclosure provide a window cover with improved elongation rate and recovery rate.

Aspects of the present disclosure also provide a display device including a cover window with improved elongation rate and recovery rate.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a window including: a first material extending in a first direction and a second material extending in a second direction that intersects the first direction, where the first material and the second material are interwoven, the first material has a first modulus, and the second material has a second modulus, and where the first modulus has a value in a range of about 0.1 megapascals (Mpa) to about 500 Mpa and the second modulus has a value in a range of about 1 gigapascals (Gpa) to about 50 Gpa.

According to another aspect of the present disclosure, there is provided a stretchable display device including: a stretchable display panel and a cover window on the stretchable display panel, where the cover window includes a first material extending in a first direction and a second material extending in a second direction that intersects the first direction. The first material and the second material are interwoven, the first material has a first modulus, and the second material has a second modulus, where the first modulus has a value in a range of about 0.1 Mpa to about 500 Mpa and the second modulus has a value in a range of about 1 Gpa to about 50 Gpa.

According to still another aspect of the present disclosure, there is provided a window including: a base layer including an intermediate layer, convex portions protruding from the intermediate layer in a thickness direction, and concave portions recessed from the intermediate layer in the thickness direction, where the base layer comprises a first material extending in a first direction and a second material extending in a second direction that intersects the first direction, and where the first material and the second material are interwoven, the first material has a first modulus, the second material has a second modulus, and the first modulus and the second modulus have different values from each other.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which:

FIG. 16 is a plan view showing a base layer of the cover window of FIG. 15.

FIG. 17 is a cross-sectional view taken along line III-III' of FIG. 15.

FIGS. 18 to 23 are plan views showing modified examples of a base layer.

DETAILED DESCRIPTION

Figure 1:
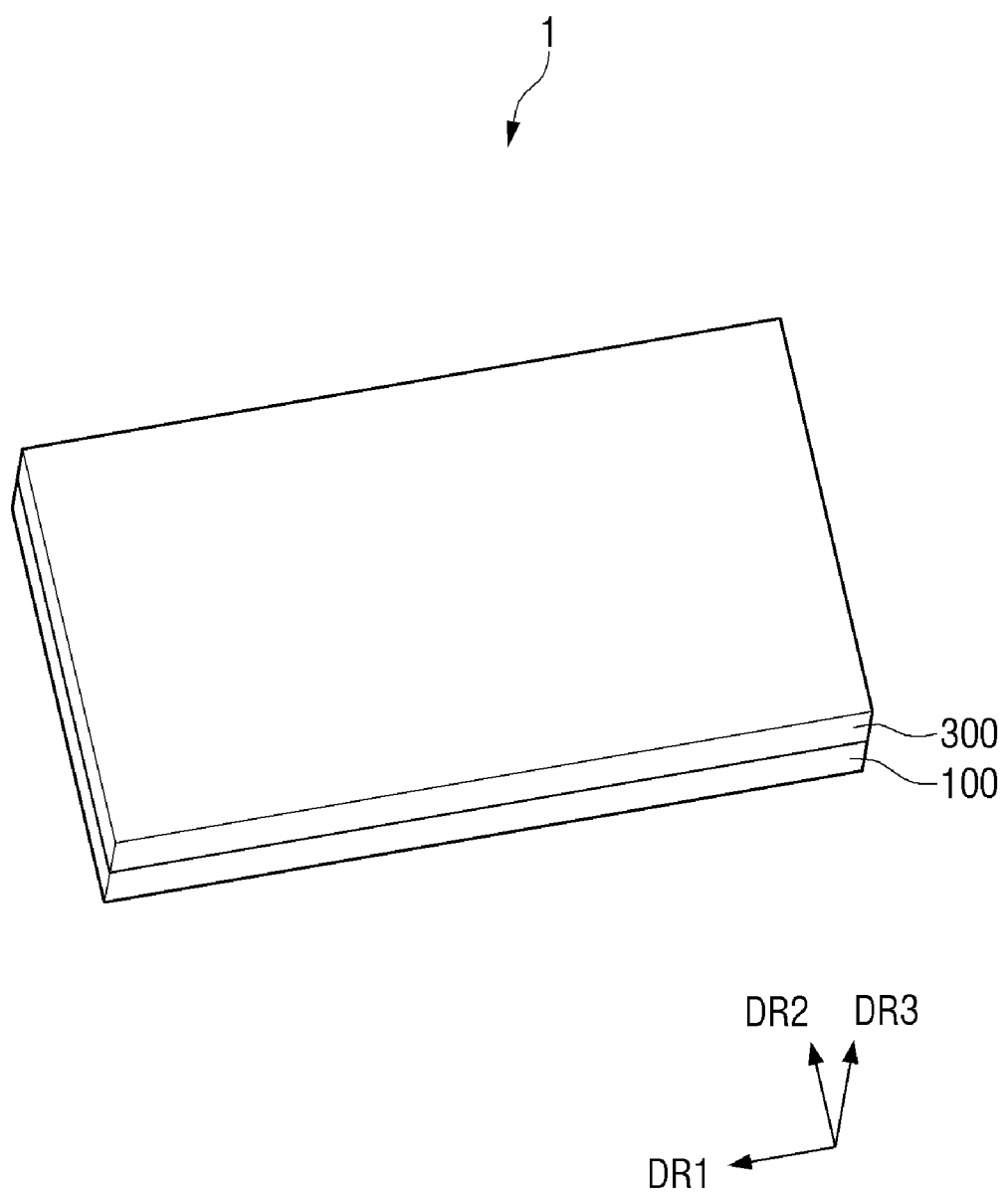
FIG. 1 is a perspective view of a display according to an embodiment.

Specific structural and functional descriptions of embodiments of the invention disclosed herein are only for illustrative purposes of the embodiments of the invention. The invention may be embodied in many different forms without departing from the spirit and significant characteristics of the invention. Therefore, the embodiments of the invention are disclosed only for illustrative purposes and should not be construed as limiting the invention. That is, the invention is only defined by the scope of the claims.

It will be understood that when an element is referred to as being related to another element such as being "coupled" or "connected" to another element, it can be directly coupled or connected to the other element or intervening elements may be present therebetween. In contrast, it should be understood that when an element is referred to as being related to another element such as being "directly coupled" or "directly connected" to another element, there are no intervening elements present. Other expressions that explain the relationship between elements, such as "between," "directly between," "adjacent to," or "directly adjacent to," should be construed in the same way.

Throughout the specification, the same reference numerals will refer to the same or like parts.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the present disclosure will be described with reference to the attached drawings.

Figure 2:
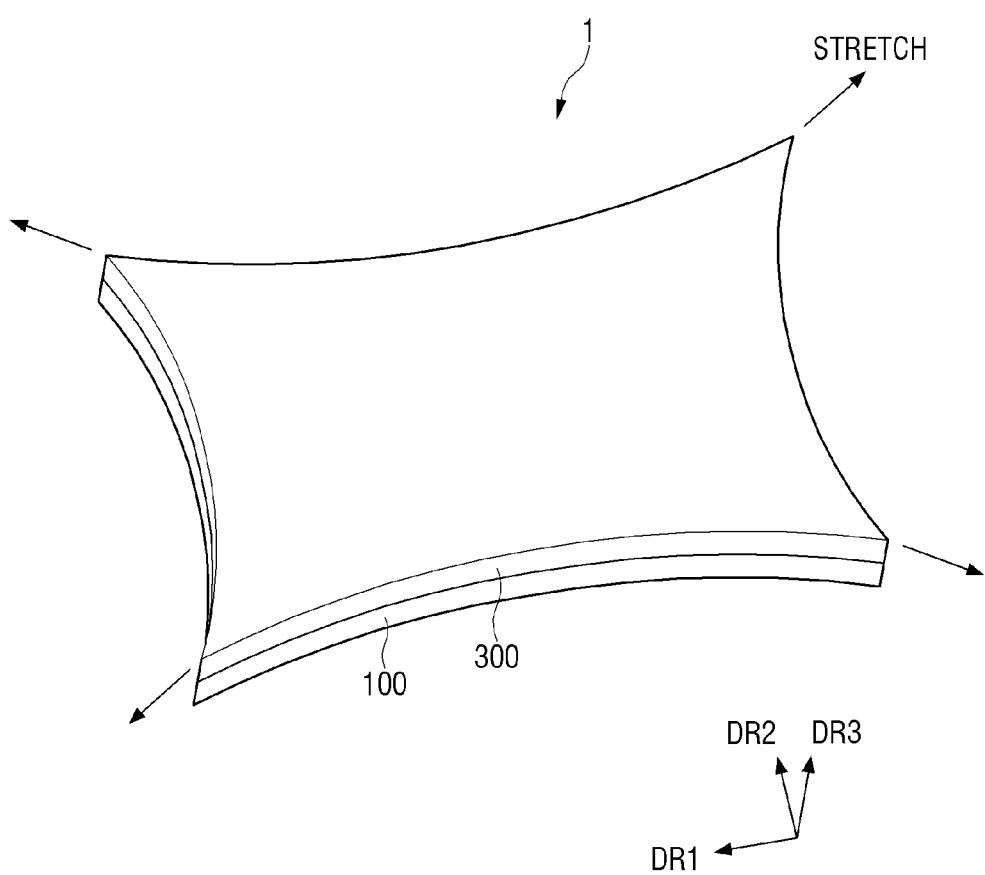
FIG. 2 is a perspective view of the display device of FIG. 1, when stretched.

FIG. 1 is a perspective view of a display according to an embodiment. FIG. 2 is a perspective view of the display device of FIG. 1, when stretched.

Referring to FIGS. 1 and 2, a display device 1 is a device for displaying a moving image or still image, and may be used for various types of electronic devices such as televisions, notebook computers, monitors, billboards, as well as portable electronic devices such as mobile phones, smartphones, tablet personal computers ("PCs") and smart watches, watch phones, mobile communication terminals, electronic notebooks, portable multimedia players ("PMPs"), navigations, and ultra mobile PCs ("UMPCs").

The display device 1 may be a light emitting display device such as an organic light emitting display device using an organic light emitting diode, a quantum dot light emitting display including a quantum dot light emitting layer, an inorganic light emitting display including an inorganic semiconductor, or a subminiature light emitting display device including a micro light emitting diode. Hereinafter, it will be mainly described that the display device 1 is an organic light emitting display device, but embodiments of the present disclosure are not limited thereto.

The display device 1 may have a rectangular shape in a plan view having long sides in a first direction DR1 and short sides in a second direction DR2 that intersects the first direction DR1. A corner at which the long side in the first direction DR1 meets the short side in the second direction DR2 may be rounded to have a certain curvature or formed at a right angle. Here, the "plan view" is a view in a third direction DR3 perpendicular to the first direction DR1 and the second direction DR2 or a view in a thickness direction.

A planar shape of the display device 1 is not limited to a quadrilateral shape but may alternatively be another shape such as a polygonal shape, circular shape, or elliptical shape. The display device 1 may be flat, but the present disclosure is not limited thereto. The display device 1 may include curved portions formed at left and right end portions thereof in another embodiment. In this case, the curved portion may have a constant curvature or have a variable curvature. The display device 1 may be flexible so as to be bendable, foldable, rollable, or at least uniaxially stretchable (or elongated).

The display device 1 includes a display panel 100 and a cover window 300.

The display panel 100 may include a substrate made of a pliable material so that the display panel 100 is also flexible so as to be bendable, foldable, rollable, or at least uniaxially stretchable. The display panel 100 may include display pixels for displaying an image. Each of the display pixels may include a light emitting element, at least one thin film transistor, and a capacitor. Hereinafter, for convenience of explanation, a description will be given focusing on a case where the display panel is a stretchable display panel that is uniaxially elongated (see FIG. 2, a display device including a stretchable display panel and a stretchable cover window which will be described below is a stretchable display device).

The stretchable display panel according to an embodiment may be a display panel having a uniaxial (i.e., stretched in one axis) elongation rate of 50% or more, a biaxial (i.e., stretched in a second axis after stretched in a first axis) elongation rate of 20% or more, and a recovery rate of 90%. The uniaxial elongation rate, biaxial elongation rate, and recovery rate will be described in greater detail while describing the cover window 300 on the display panel 100.

As described above, the display panel 100 according to an embodiment is a stretchable display panel. Since the stretchable display panel is integrally coupled to the cover window 300 disposed thereon, the uniaxial elongation rate, biaxial elongation rate, and recovery rate of the cover window 300 may be the same as or similar to the uniaxial elongation rate, biaxial elongation rate, and recovery rate of the stretched display panel 100 integrally coupled thereto.

Figure 3:
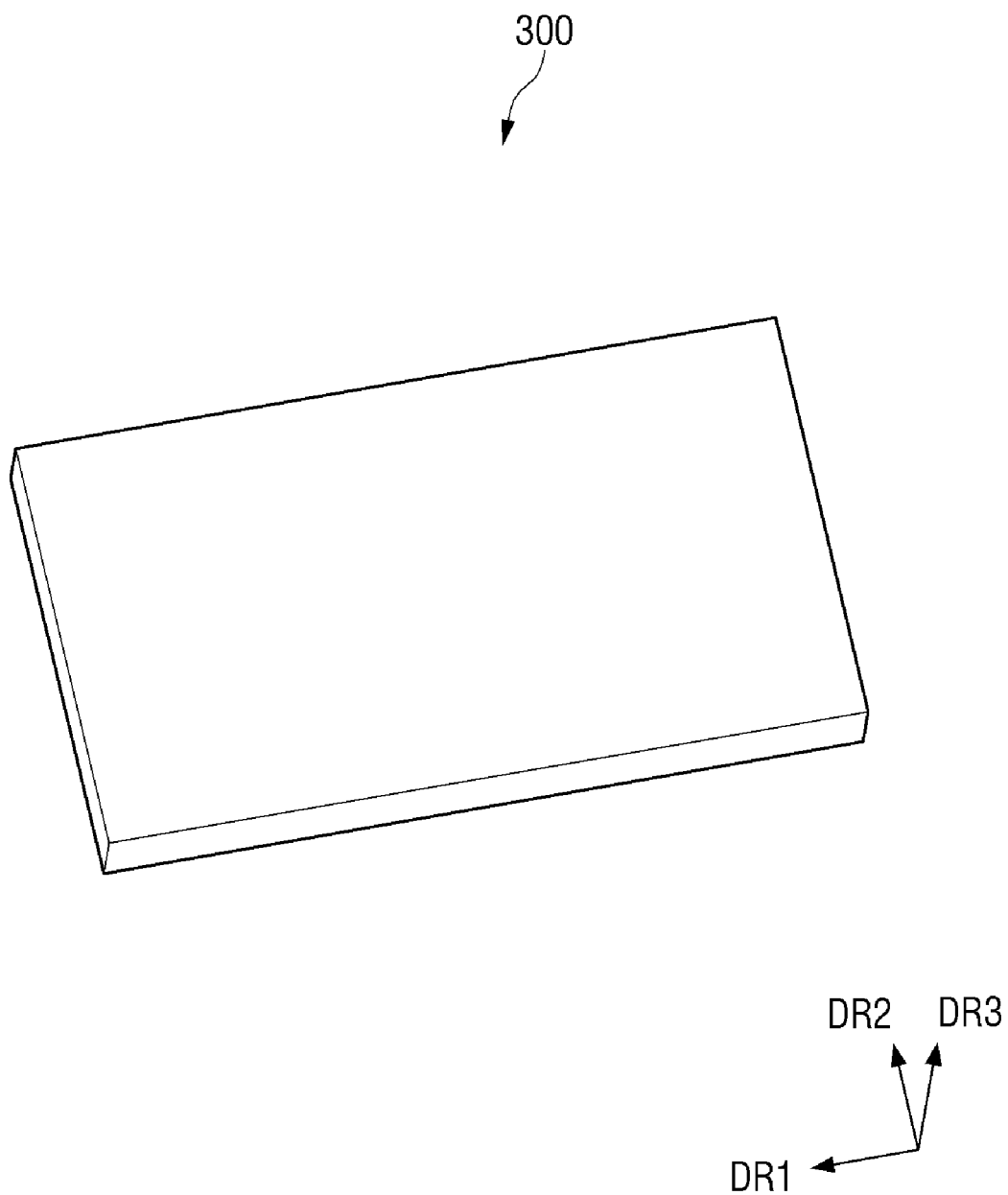
FIG. 3 is a perspective view of a cover window of the display device of FIG. 1.

FIG. 3 is a perspective view of a cover window of the display device of FIG. 1.

Referring to FIG. 3, the cover window 300 according to an embodiment may have a rectangular shape in a plan view having long sides in the first direction DR1 and short sides in the second direction DR2 that intersects the first direction DR1. A corner at which the long side in the first direction DR1 meets the short side in the second direction DR2 may be rounded to have a certain curvature or formed at a right angle.

Figure 4:
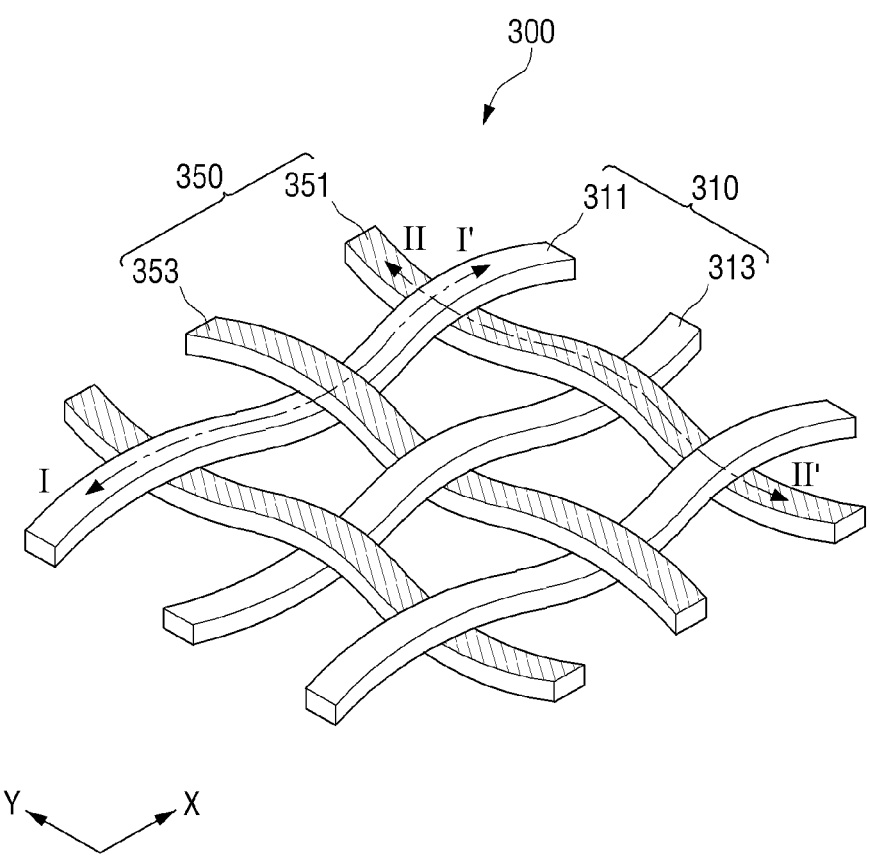
FIG. 4 is a perspective view of a first material and a second material of a cover window according to an embodiment.
Figure 5:
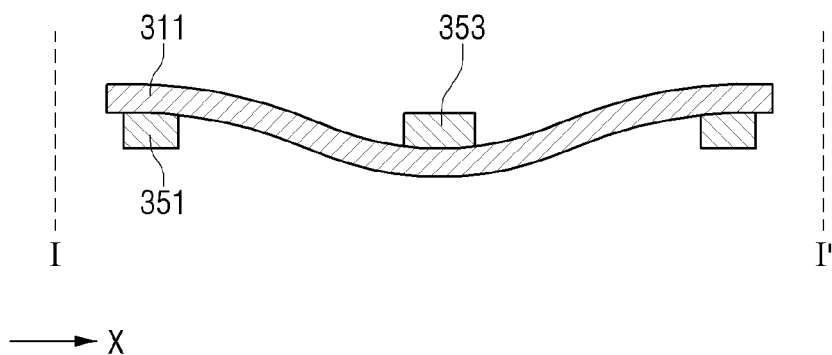
FIG. 5 is a cross-sectional view taken along line I-I' of FIG. 4.
Figure 6:
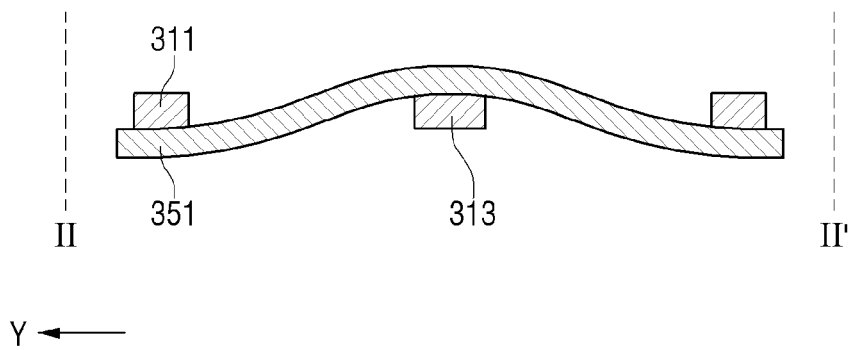
FIG. 6 is a cross-sectional view taken along line II-II' of FIG. 4.

FIG. 4 is a perspective view of a first material and a second material of a cover window according to an embodiment. FIG. 5 is a cross-sectional view taken along line I-I' of FIG. 4. FIG. 6 is a cross-sectional view taken along line II-II' of FIG. 4.

Referring to FIGS. 4 to 6, in order to design the above-described cover window 300 having a uniaxial (or first axis) elongation rate of 50% or more, a biaxial (stretched in a second axis after stretched in a first axis) elongation rate of 20% or more, and a recovery rate of 90%, a material constituting the cover window 300 should be considered.

In an embodiment, for example, when the cover window is formed of thin film glass and is stretched 20% biaxially (stretched in a second axis after stretched in a first axis), the cover window may be broken, beyond the breakage limit. In addition, when the cover window is formed of plastic, it may be difficult to stretch the cover window 20% biaxially (stretched in a second axis after stretched in a first axis).

The cover window 300 according to an embodiment may be formed of a first material 310 and a second material 350 in order to satisfy the conditions of a uniaxial (or first axis) elongation rate of 50% or more, a biaxial (stretched in a second axis after stretched in a first axis) elongation rate of 20% or more, and a recovery rate of 90%. The second axis may be extended in a direction that crosses the first axis orthogonally, but is not limited thereto.

The first material 310 and the second material 350 may be different from each other. That is, the cover window 300 may be formed of heterogeneous materials. The first material 310 and the second material 350 may be coupled to each other in a weaving manner.

In FIG. 4, the first material 310 and the second material 350 are interwoven in plain weave, but embodiments are not limited thereto. It should be noted that the first material 310 and the second material 350 may be interwoven in 2/1 twill weave, or in sateen weave in another embodiment. Hereinafter, for description of explanation, a description will be given focusing on an example the first material 310 and the second material 350 are interwoven in plain weave.

The first material 310 may extend in X direction, and may be provided in plural. The plurality of first materials 310 may be arranged in Y direction that intersects the X direction. The plurality of first materials 310 may include a 1-1 material 311 and a 1-2 material 313. The 1-1 material 311 and the 1-2 material 313 may be alternately arranged along the Y direction. Here, the X direction and the Y direction may be the same as or different from the first direction DR1 and the second direction DR2.

The second material 350 may extend in the Y direction, and may be provided in plural. The plurality of second materials 350 may be arranged in the X direction. The plurality of second materials 350 may include a 2-1 material 351 and a 2-2 material 353. The 201 material 351 and the 2-2 material 353 may be alternately arranged in the X direction.

As shown in FIGS. 4 to 6, the first material 310 (the 1-1 material 311 and the 1-2 material 313) and the second material 350 (the 2-1 material 351 and the 2-2 material 353) may be interwoven by alternately passing over and under each other. For example, with respect to the 1-1 material 311 extending in the X direction, the 2-1 material 351 may be crossed below the 1-1 material 311 and the 2-2 material 353 may be crossed above the 1-1 material 311.

In addition, with respect to the 1-2 material 313 extending in the X direction, the 2-1 material 351 may be crossed above the 1-2 material 313 and the 2-2 material 353 may be crossed below the 1-2 material 313.

Also, with respect to the 2-1 material 351 extending in the Y direction, the 1-1 material 311 may be crossed above the 2-1 material 351 and the 1-2 material 313 may be crossed below the 2-1 material 351.

Further, with respect to the 2-2 material 353 extending in the Y direction, the 1-1 material 311 may be crossed below the 2-2 material 353 and the 1-2 material 313 may be crossed above the 2-2 material 353.

The first material 310 may be a material that improves the elongation rate of the cover window 300, and the second material 350 may be a material that improves the recovery rate of the cover window 300.

Hereinafter, a description will be given of the elongation rate and the recovery rate of the cover window 300 including the first material 310 that improving the elongation rate and the second material 350 that improves the recovery rate.

Figure 7:
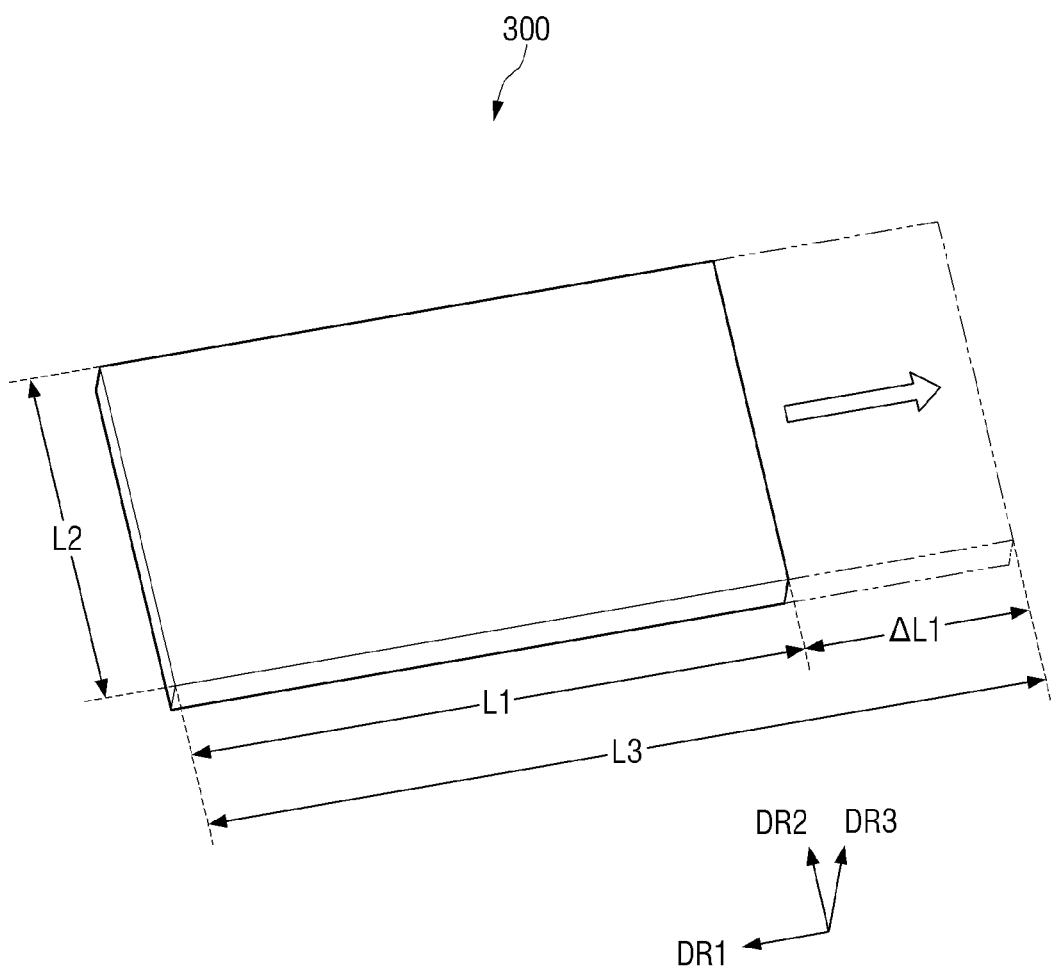
FIGS. 7 and 8 are perspective views showing uniaxial elongation rate of the cover window of FIG. 3.
Figure 8:
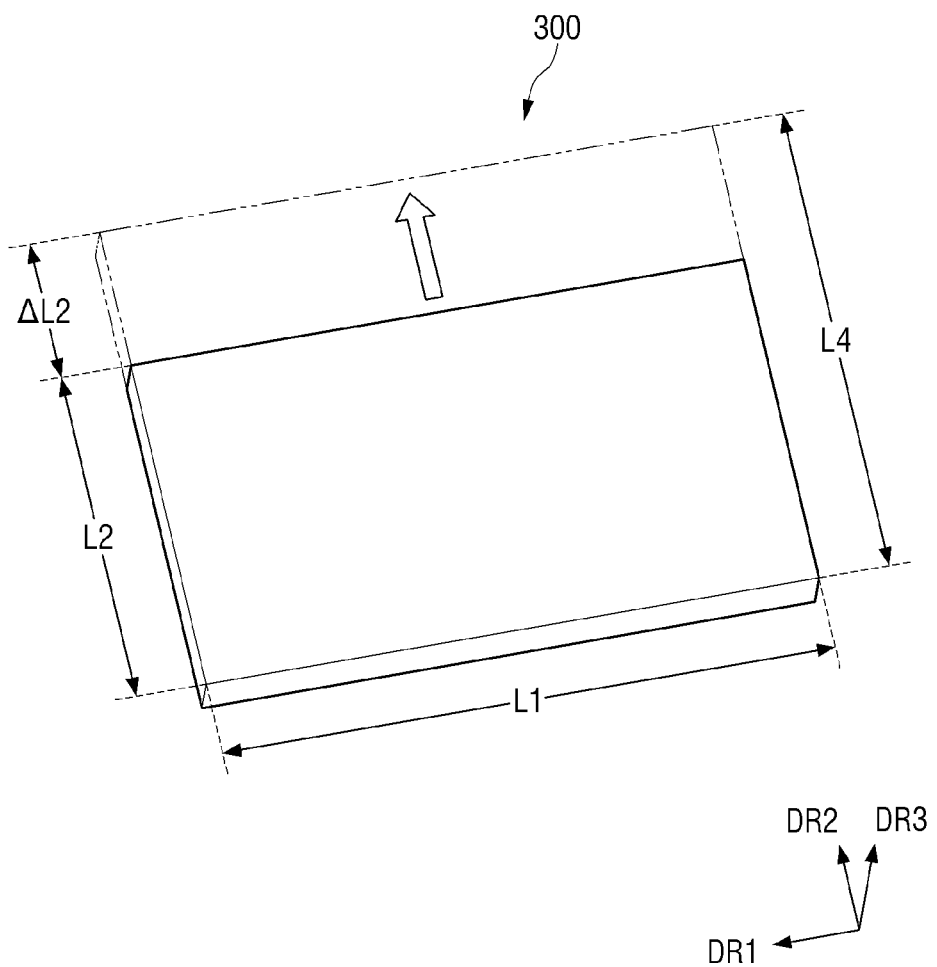

FIGS. 7 and 8 are perspective views showing uniaxial elongation rate of the cover window of FIG. 3. FIGS. 9 to 12 are perspective views showing biaxial elongation rate of the cover window of FIG. 3.

The elongation rate of the cover window 300 is first described.

In an embodiment, the cover window 300 may have a uniaxial elongation rate of 50%. Here, the term "uniaxial" may refer to a first axis or a second axis. In FIG. 7, the first axis may be the first direction DR1.

More specifically, the cover window 300 may have a first length on the long sides extending in the first direction DR1 and a second length on the short sides extending in the second direction DR2. When one end in the first direction DR1 is stretched by a first stretched length ΔL1 in the first direction DR1 while the other end in the first direction DR1 is fixed, the long sides of the cover window 300 stretched along the first axis may have a third length L3. That is, the third length L3 may be the sum of the first length L1 and the first stretched length ΔL1. Here, the first length L1 is a length of the cover window 300 in the first direction DR1 before stretched. Since the cover window 300 according to an embodiment has a uniaxial elongation rate of 50% or more, the first stretched length ΔL1 may be equal to or greater than ½ times the first length L1 and the third length L3 may be equal to or greater than 1.5 times the first length L1.

In FIG. 8, the second axis may be the second direction DR2.

More specifically, when the cover window 300 has the second length L2 on short sides extending in the second direction DR2 and one end of the cover window 300 in the second direction DR2 is stretched by a second stretched length ΔL2 in the second direction DR2 while the other end is fixed, the short sides of the cover window 300 stretched along the second axis may have a fourth length L4. That is, the fourth length L4 may be the sum of the second length L2 and the second stretched length ΔL2. Here, the second length L1 is a length of the cover window 300 in the second direction DR2 before stretched. Since the cover window 300 according to an embodiment has a uniaxial elongation rate of 50% or more, the second stretched length ΔL2 may be equal to or greater than ½ times the second length L2 and the fourth length L4 may be equal to or greater than 1.5 times the second length L2.

FIGS. 9 to 12 shows the biaxial elongation rate of the cover window 300.

Figure 9:
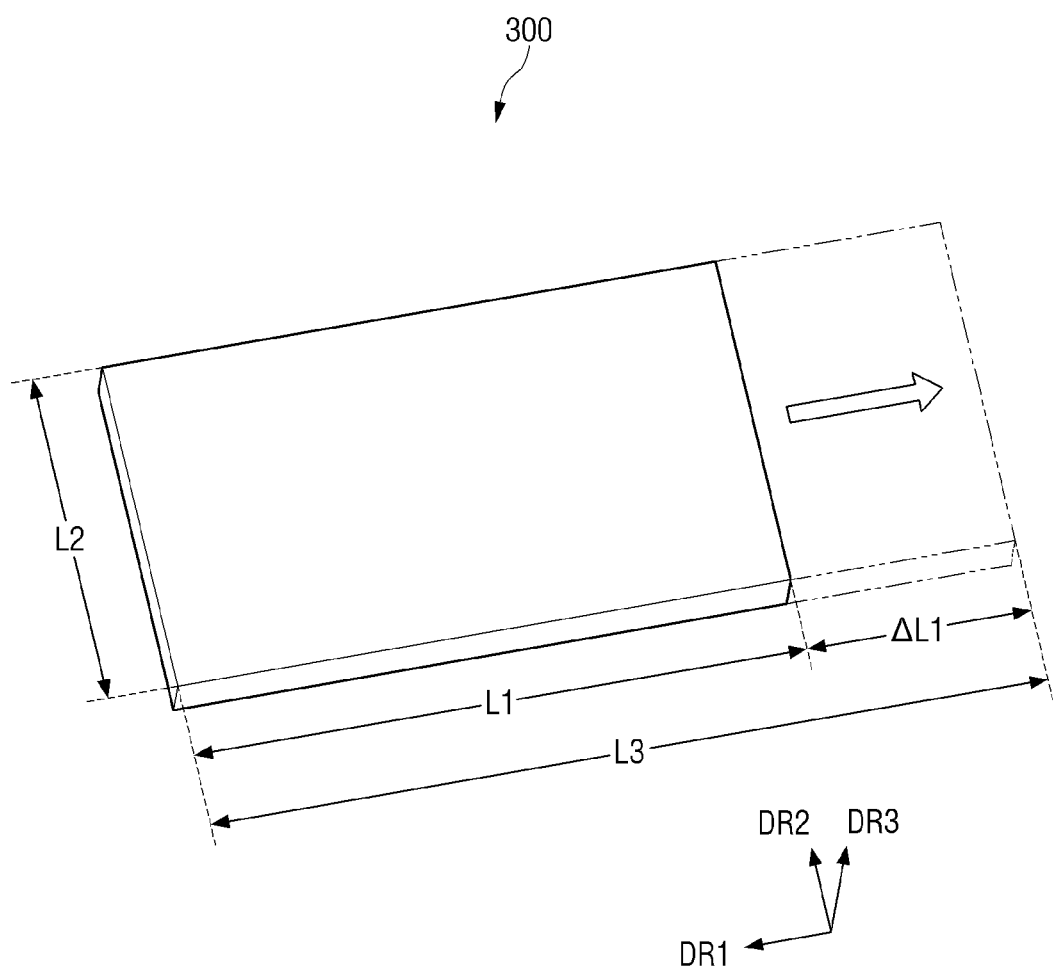
FIGS. 9 to 12 are perspective views showing biaxial elongation rate of the cover window of FIG. 3.
Figure 10:
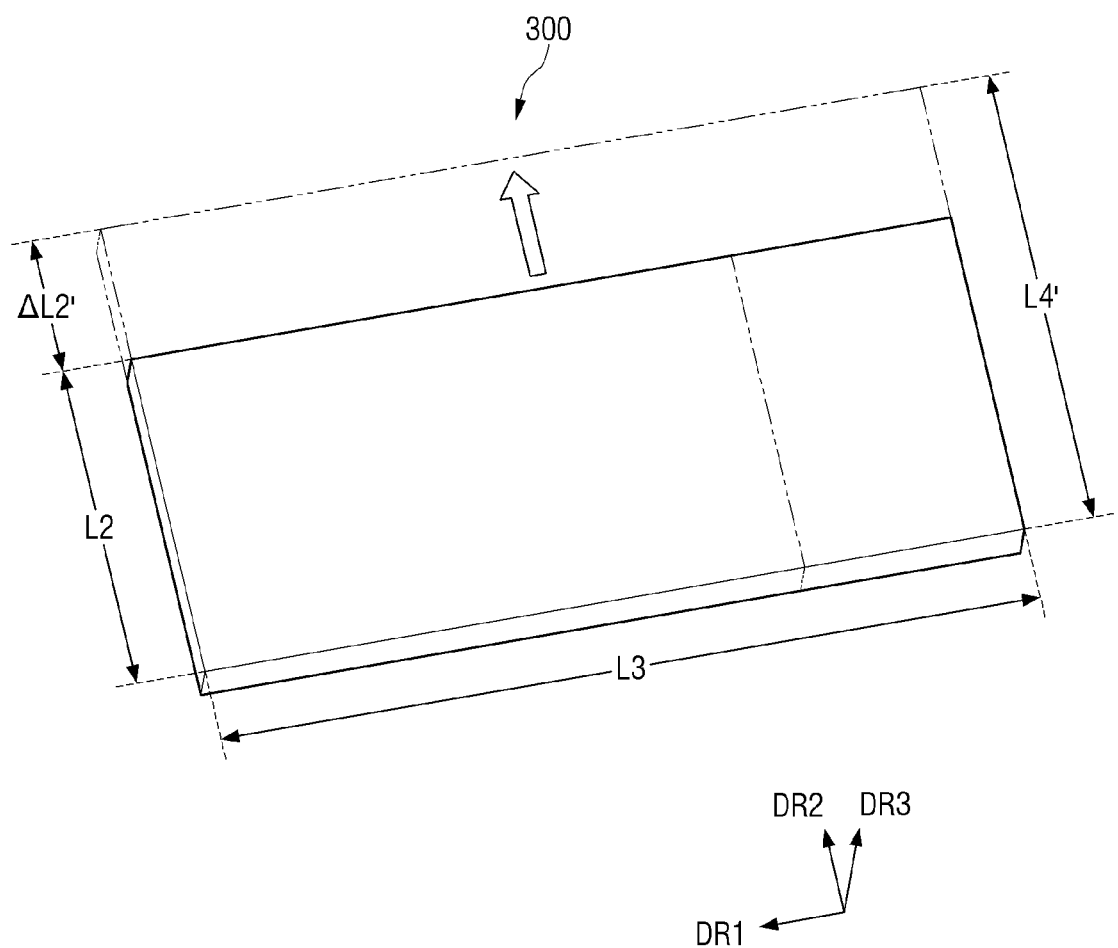
Figure 11:
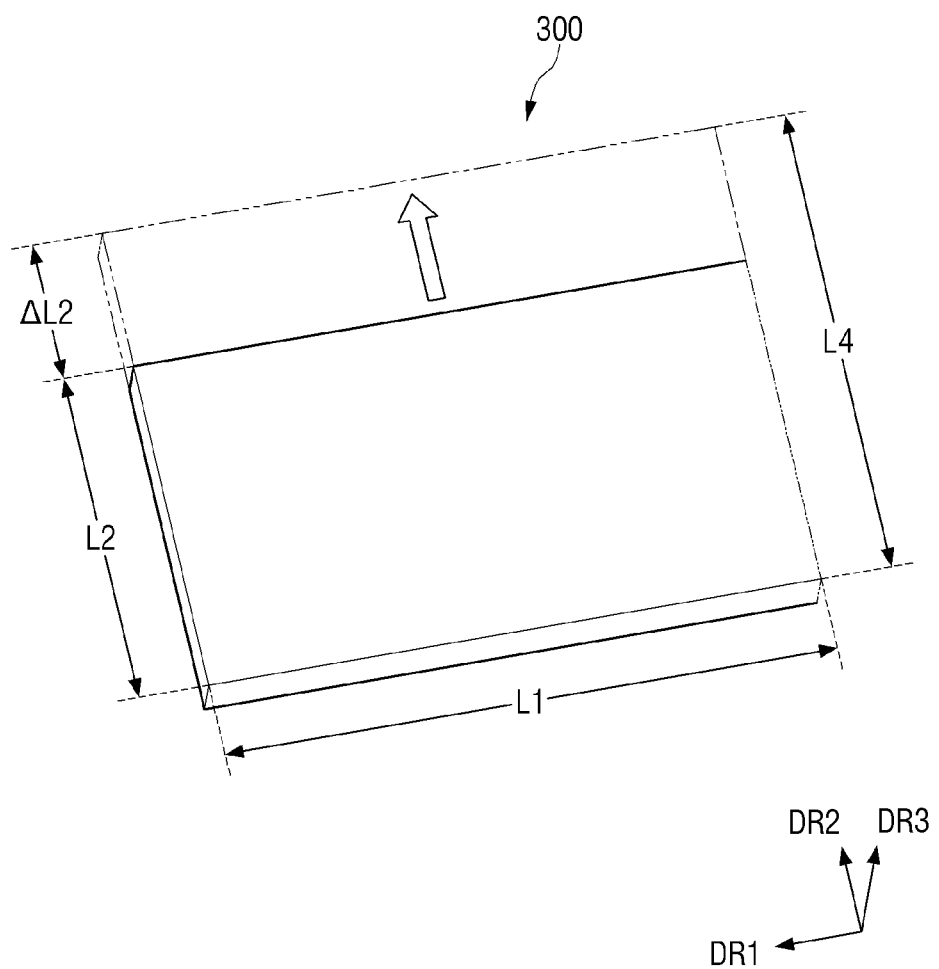
Figure 12:
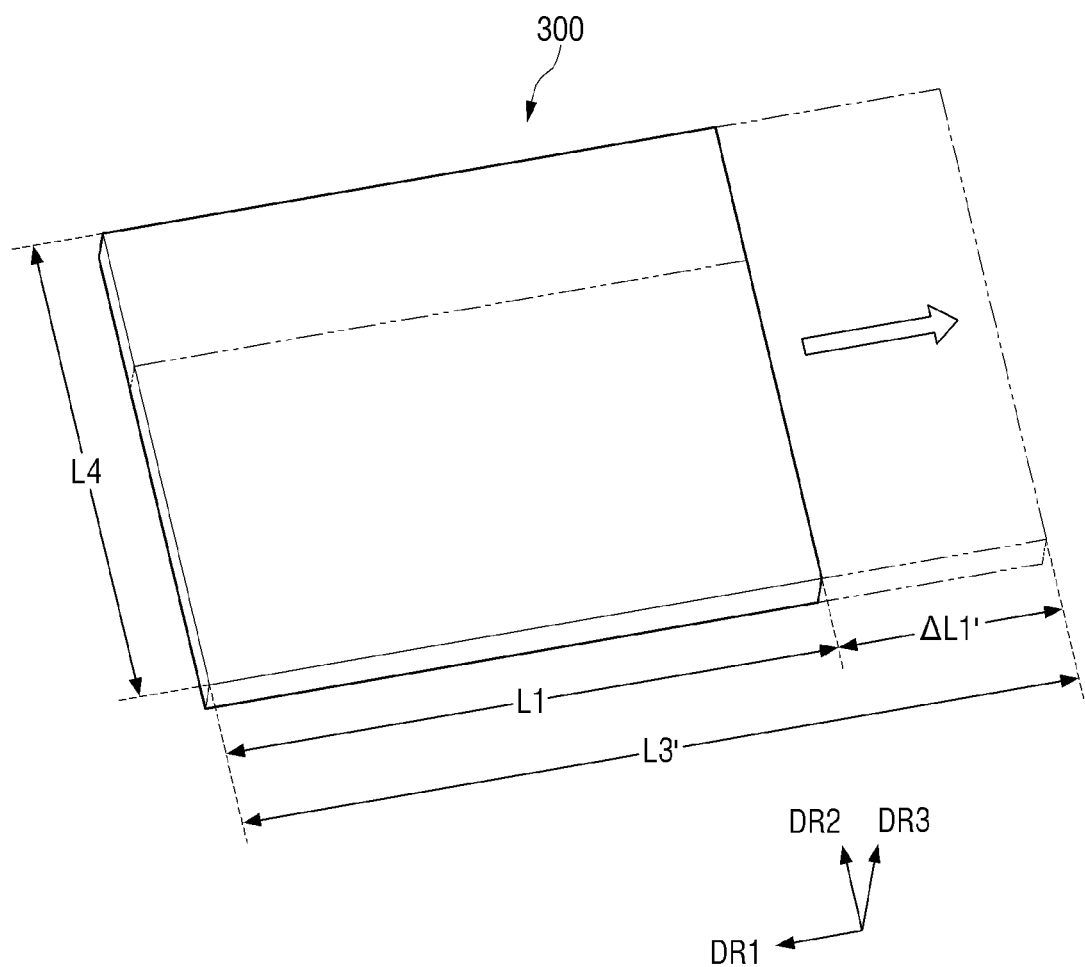

FIGS. 9 and 10 shows an example in which the cover window 300 is stretched along the first axis (e.g., the first direction DR1) and then stretched along the second axis (e.g., the second direction DR2), and FIGS. 11 and 12 shows an example in which the cover window 300 is stretched along the second axis and then stretched along the first axis.

Referring to FIGS. 9 and 10, one end in the first direction DR1 is stretched by a first stretched length ΔL1 in the first direction DR1 while the other end in the first direction DR1 is fixed. In this case, the long sides of the cover window 300 stretched along the first axis may have a third length L3, the first stretched length ΔL1 may be less than or equal to ½ times a first length L1, and a third length L3 may be greater than 1 time and less than or equal to 1.5 times the first length L1. Then, one end in the second direction DR2 of the cover window 300 is stretched by a second stretched length ΔL2' in the second direction DR2 while the other end in the second direction DR2 is fixed. Since the biaxial elongation rate of the cover window 300 according to an embodiment is 20% or more, the second stretched length ΔL2' may be equal to or greater than ⅕ times a second length L2 and a fourth length L4' may be greater than or equal to 1.2 times the second length L2.

Referring to FIGS. 11 and 12, one end in the second direction DR2 is stretched by a second stretched length ΔL2 in the second direction DR2 while the other end in the second direction DR2 is fixed. In this case, the short sides of the cover window 300 stretched along the second axis (e.g., the second direction DR2) may have a fourth length L4, the second stretched length ΔL2 may be less than or equal to ½ times the second length L2, and the fourth length L4 may be greater than 1 time and less than or equal to 1.5 times the second length L2. Thereafter, one end in the first direction DR1 of the cover window 300 is stretched by a first stretched length ΔL1' in the first direction DR1 while the other end in the first direction DR1 is fixed. Since the biaxial (stretched in a second axis after stretched in a first axis) elongation rate of the cover window 300 according to an embodiment is 20% or more, the first stretched length ΔL1' may greater than or equal to ⅕ times the first length L1 and a third length L3' may be greater than or equal to 1.2 times the first length L1.

Hereinafter, recovery rate of the cover window 300 will be described.

Figure 13:
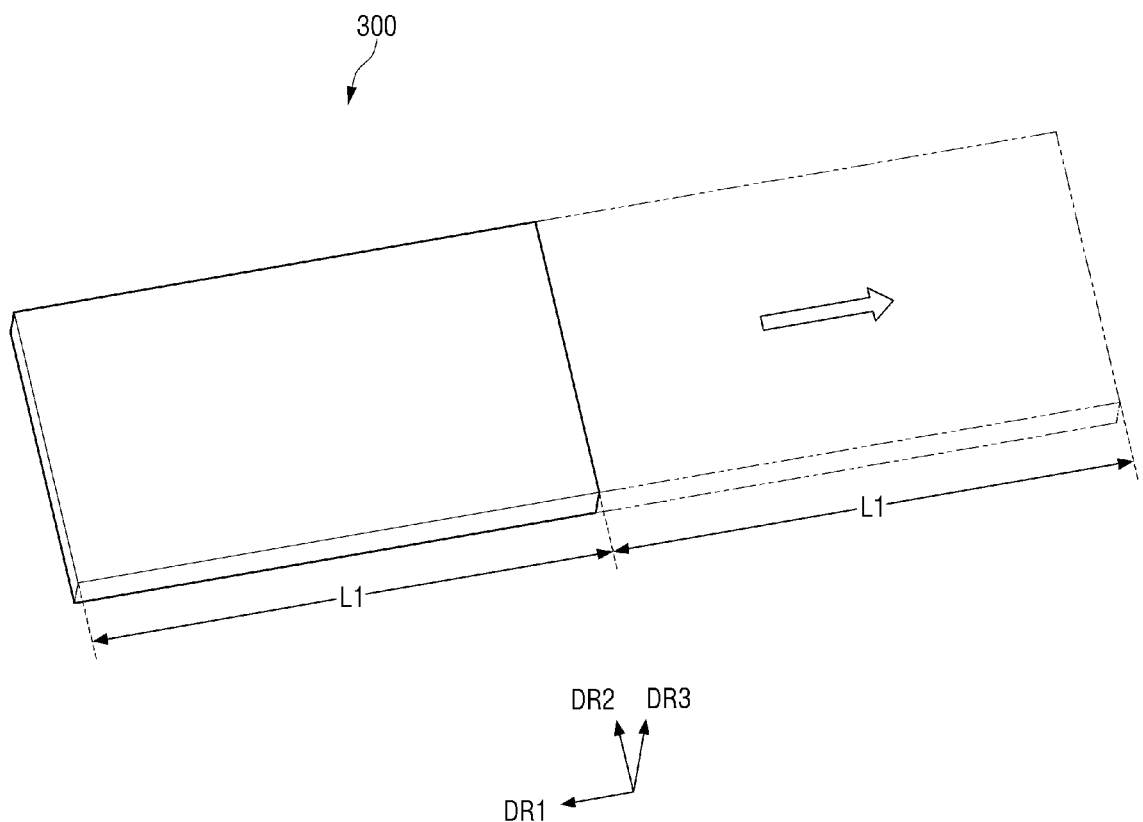
FIGS. 13 and 14 are perspective views showing recovery rate of the cover window of FIG. 3.
Figure 14:
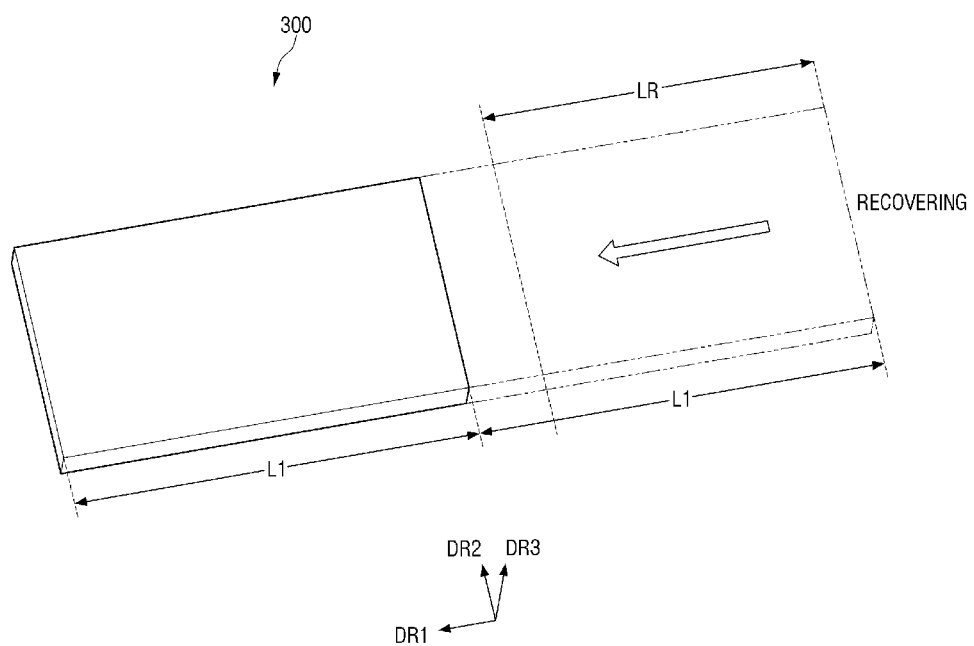

FIGS. 13 and 14 are perspective views showing recovery rate of the cover window of FIG. 3.

Referring to FIGS. 13 and 14, while one end of the cover window 300 in the first direction DR1 is fixed, the other end of the cover window 300 in the first direction DR1 is stretched. In an embodiment, a stretched length may be a first length L1 that is a length of long sides of the cover window 300 extended in the first direction DR1. That is, the long side length extending in the first direction DR1 of the cover window 300 stretched in the first direction DR1 may be twice the first length L1. That is, a tensile force may be applied to the cover window 300 in the direction of the other side of the first direction DR1 (or the first axis) so that the extended length is twice the long side length L1 in the first direction DR1 of the cover window 300. The other end in the first direction DR1 of the cover window 300 is stretched in the first direction DR1, and then maintained for 1000 seconds.

Thereafter, when the other end in the first direction DR1 is released (or the tensile force is removed), the recovery rate of the cover window 300 may be 90% or more in an embodiment. That is, the other end in the first direction DR1 of the cover window 300 stretched in the first direction is released, the cover window 300 is recovered, and at this time, the reduced length LR may be 90% or more of the first length L1 that is the stretched length in an embodiment. In other words, when the other end in the first direction DR1 of the cover window 300 stretched in the first direction DR1 is released, the cover window 300 has a strain only as high as 10% of the first length L1.

The first material 310 of the cover window 300 may endow the cover window 300 with the above-described elongation rates (uniaxial elongation rate and biaxial elongation rate), and the second material 350 may endow the cover window 300 with the above-described recovery rate.

In order to satisfy the uniaxial (or first axis) elongation rate of 50% or more, the biaxial (stretched in a second axis after stretched in a first axis) elongation rate of 20% or more, and the recovery rate of 90% or more of the above-described cover window 300, the first material 310 may have a first modulus and the second material 350 may have a second modulus. Generally, as the modulus increases, recovery rate may be improved, and as the modulus decreases, elongation rate may be improved.

The first modulus according to an embodiment may be in the range of approximately 0.1 Mpa to approximately 500 Mpa, and the second modulus may be in the range of approximately 1 Gpa to approximately 50 Gpa. That is, as the first material 310 has the first modulus in the range of approximately 0.1 Mpa to approximately 500 Mpa, the elongation rate of the cover window 300 may be improved, and as the second material 350 has the second modulus in the range of approximately 1 Gpa to approximately 50 Gpa, the recovery rate of the cover window 300 may be improved.

Each of the first material 310 and the second material 350 may be selected from materials satisfying the first and second moduli described above, respectively.

In an embodiment, for example, the first material 310 having the first modulus may include, but not limited to, spandex, polyurethane ("PU"), polyether block amide ("PEBA"), nylon, or the like. The second material 350 having the second modulus may include, but not limited to, glass fiber, polyimide ("PI"), or the like.

Since light emitted from the display panel 100 is viewed by a user through the cover window 300, the cover window 300 may have a light transmittance of approximately 91% (visible light wavelength range of 380 nanometers (nm) to 580 nm), and a yellowness index may be approximately 0.5 or less.

Further, when the cover window 300 is formed in such a way that the first and second materials 310 and 350 are interwoven, the refractive indices of the first and second materials 310 and 350 must be matched with each other.

In an embodiment, for example, the first material 310 may have a first refractive index and the second material 350 may have a second refractive index. A difference between the first refractive index and the second refractive index may be 0.01 or less. When the difference between the first refractive index and the second refractive index is 0.01 or less, there is little change in the path of the light emitted from the display panel 100 in an overlapping area between the first material 310 and the second material 350 (area where the first material 310 and the second material 350 are interwoven and coupled), so that the overlapping area between the first material 310 and the second material 350 can be prevented from being distinguished by the user.

In an embodiment, for example, when the first refractive index is in the range of 1.5 to 1.6, the second refractive index may be in the range of 1.49 to 1.61, and when the second refractive index is in the 1.55 to 1.57, the first refractive index may be in the range of 1.54 to 1.58, but embodiments are not limited thereto.

Figure 15:
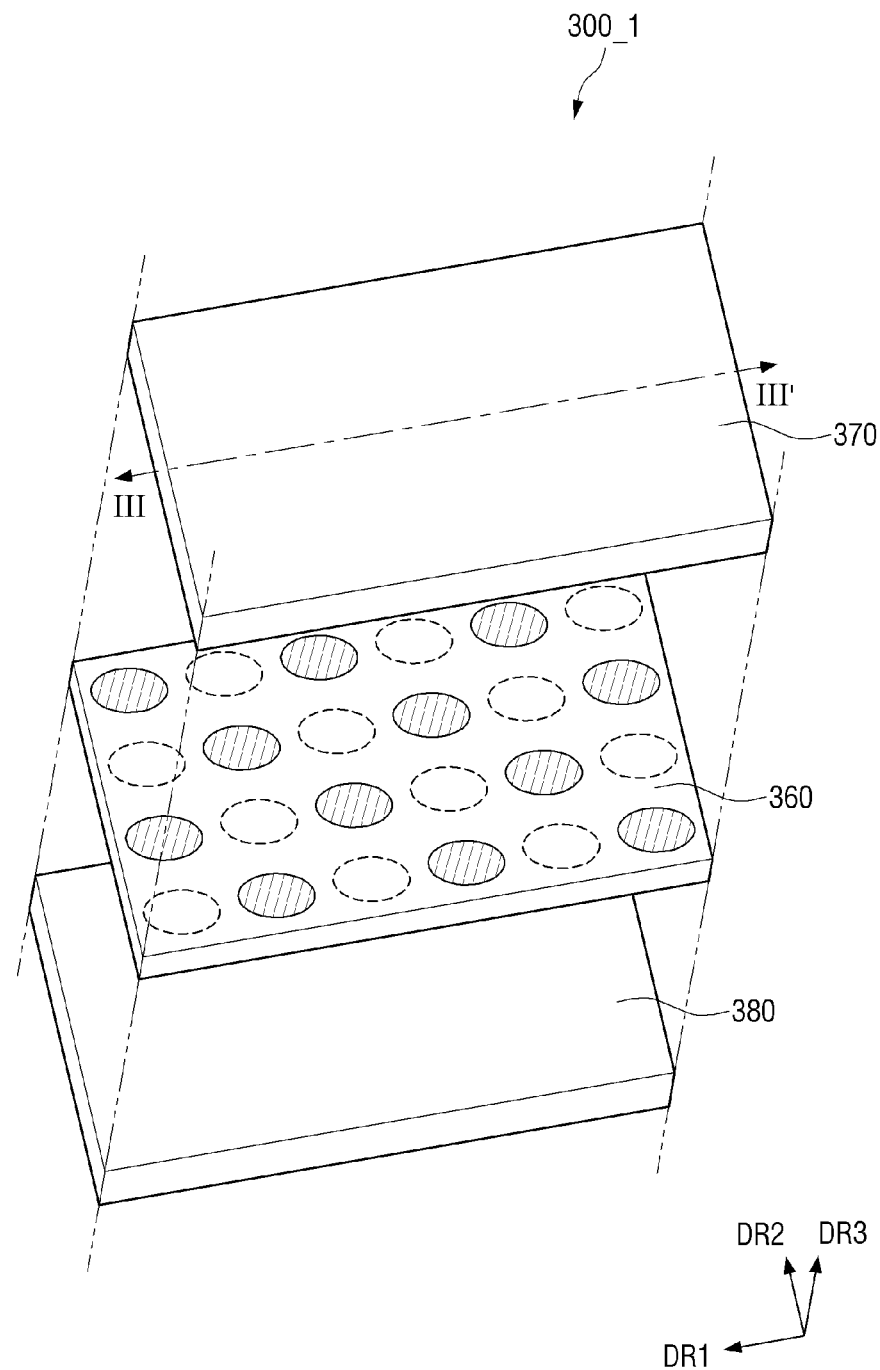
FIG. 15 is a perspective view of a cover window according to another embodiment.

FIG. 15 is an exploded perspective view of a cover window according to another embodiment. FIG. 16 is a plan view showing a base layer of the cover window of FIG. 15. FIG. 17 is a cross-sectional view taken along line III-III' of FIG. 15.

Referring to FIGS. 15 to 17, a cover window 300_1 according to the present embodiment is different from the cover window 300 of FIG. 3 in that the cover window 300_1 includes a base layer 360, a first planarization layer 370 positioned on an upper portion of the base layer 360, and a second planarization layer 380 positioned on a lower portion of the base layer 360.

To be more specific, the cover window 300_1 may include the base layer 360, the first planarization layer 370 positioned on the upper portion of the base layer 360, and the second planarization layer 380 positioned on the lower portion of the base layer 360.

The base layer 360 may be made of the same material as that of the cover window 300 described with reference to FIGS. 3 to 6. That is, the base layer 360 may be made of the first material 310 and the second material 350 described above with reference to FIGS. 3 to 6.

Although the base layer 360 is made of the first material 310 and the second material 350, the base layer 360 is different from the cover window 300 of FIGS. 3 to 6 in that it has a corrugated structure.

The corrugated structure may be made through a separate molding process after weaving the cover window 300 of FIGS. 3 to 6. The molding process may be performed by applying a predetermined temperature and pressure. The corrugated structure is shown in FIGS. 15 to 17. The base layer 360 may include an intermediate layer 365, a convex portion 361 protruding upward from the intermediate layer 365, and a concave portion 363 concavely recessed downward from the intermediate layer 365.

The convex portion 361 and the concave portion 363 may each have a circular shape in a plan view:

A thickness T360 of the base layer 360 may be constant regardless of the intermediate layer 365, the convex portion 361, and the concave portion 363.

The cover window 300_1 according to the present embodiment includes the intermediate layer 365, the convex portion 361 protruding upward from the intermediate layer 365, and the concave portion 363 concavely recessed downward from the intermediate layer 365, so that elongation rate and recovery rate of the cover window 300_1 can be further improved. As described above, the convex portion 361 and the concave portion 363 may be formed by molding the base layer 360 at a predetermined temperature and pressure. The method of forming the convex portion 361 and the concave portion 363 is widely known in the art, and thus a detailed description thereof will be omitted.

Arrangement density of the convex portion 361 and the concave portion 363 may be the same as each other as shown in FIG. 16, but embodiments are not limited thereto, such that the arrangement density of the convex portions 361 may be greater than that of the concave portions 363 or the arrangement density of the concave portions 363 may be greater than that of the convex portions 361 in another embodiment.

That is, the base layer 360 has a corrugated structure having both the convex portions 361 and the concave portions 363. However, when the cover window includes the base layer 360 only, the corrugated structure of the base layer 360 having the convex portions 361 and the concave portions 363 may be visually recognized from the outside.

Therefore, it is desirable to dispose planarization layers 370 and 380 respectively on the upper portion and the lower portion of the base layer 360 having the convex portions 361 and the concave portions 363. However, when a refractive index difference at the interface of each of the first planarization layer 370, the base layer 360, and the second planarization layer 380 from the top is greater than a predetermined refractive index difference, the interface of each of the first planarization layer 370, the base layer 360, and the second planarization layer 380 may be visually recognized, which may cause display defects. Thus, each of the first planarization layer 370 and the second planarization layer 380 may be designed to have a refractive index difference of 0.01 or less with respect to the refractive index of the base layer 360.

The first planarization layer 370 and the second planarization layer 380 may have a third modulus and a fourth modulus, respectively, and the third and fourth moduli may each be in the range of 0.05 Mpa to 500 Mpa.

The first planarization layer 370 and the second planarization layer 380 may each include a resin. The resin may be a high stretch material. For example, a high stretch material may include at least one of acylate, silicone, and urethane. The first planarization layer 370 and the second planarization layer 380 may be the same as or different from each other.

An upper surface of the first planarization layer 370 and a lower surface of the second planarization layer 380 may each be flat. That is, each of the first planarization layer 370 and the second planarization layer 380 may planarize stepped portions formed from the base layer 360.

Accordingly, the thickness T370a of the first planarization layer 370 on the concave portion 363 may be greater than each of the thickness T370c of the first planarization layer 370 on the convex portion 361 and the thickness T370b of the first planarization layer 370 on the intermediate layer 365, and the thickness T370c of the first planarization layer 370 on the convex portion 361 may be smaller than the thickness T370b of the first planarization layer 370 on the intermediate layer 365.

The thickness T380c of the second planarization layer 380 on the concave portion 363 may be smaller than each of the thickness T380c of the second planarization layer 380 on the convex portion 361 and the thickness T380b of the second planarization layer 380 on the intermediate layer 365, and the thickness T380a of the second planarization layer 380 on the convex portion 361 may be greater than the thickness T380b of the second planarization layer 380 on the intermediate layer 365.

Hereinafter, various planar shapes of the convex portion and the concave portion are shown.

FIGS. 18 to 23 are plan views showing modified examples of a base layer.

Referring to FIG. 18, a base layer 360a according to the present embodiment is different from the base layer 360 of FIG. 16 in that planar shapes of convex portions 361a and concave portions 363b are triangular. The base layer 360a includes the convex portions 361a, an intermediate layer 365a, and concave portions 363a. Other descriptions have been described above with reference to FIGS. 16 and 17, and redundant descriptions will be omitted.

Referring to FIG. 19, a base layer 360b according to the present embodiment is different from the base layer 360 of FIG. 16 in that planar shapes of convex portions 361b and concave portions 363b are quadrilateral. The base layer 360b includes the convex portions 361b, an intermediate layer 365b, and concave portions 363b. Other descriptions have been described above with reference to FIGS. 16 and 17, and redundant descriptions will be omitted.

Referring to FIG. 20, a base layer 360c according to the present embodiment is different from the base layer 360 of FIG. 16 in that planar shapes of convex portions 361c and concave portions 363c are pentagonal. The base layer 360c includes the convex portions 361c, an intermediate layer 365c, and concave portions 363c. Other descriptions have been described above with reference to FIGS. 16 and 17, and redundant descriptions will be omitted.

Referring to FIG. 21, a base layer 360d according to the present embodiment is different from the base layer 360 of FIG. 16 in that planar shapes of convex portions 361d and concave portions 363d are hexagonal. The base layer 360d includes the convex portions 361d, an intermediate layer 365d, and concave portions 363d. Other descriptions have been described above with reference to FIGS. 16 and 17, and redundant descriptions will be omitted.

Figure 22:
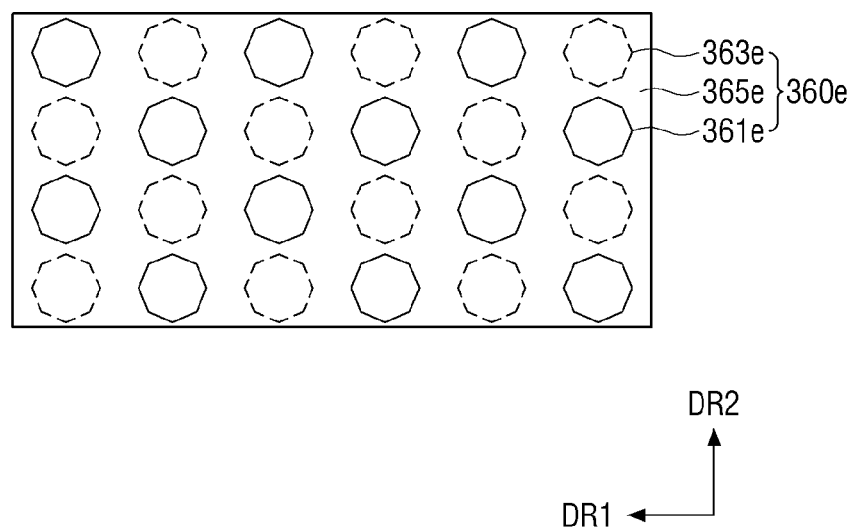

Referring to FIG. 22, a base layer 360d according to the present embodiment is different from the base layer 360 of FIG. 16 in that planar shapes of convex portions 361d and concave portions 363d are octagonal. The base layer 360e includes the convex portions 361e, an intermediate layer 365e, and concave portions 363e. Other descriptions have been described above with reference to FIGS. 16 and 17, and redundant descriptions will be omitted.

Figure 23:
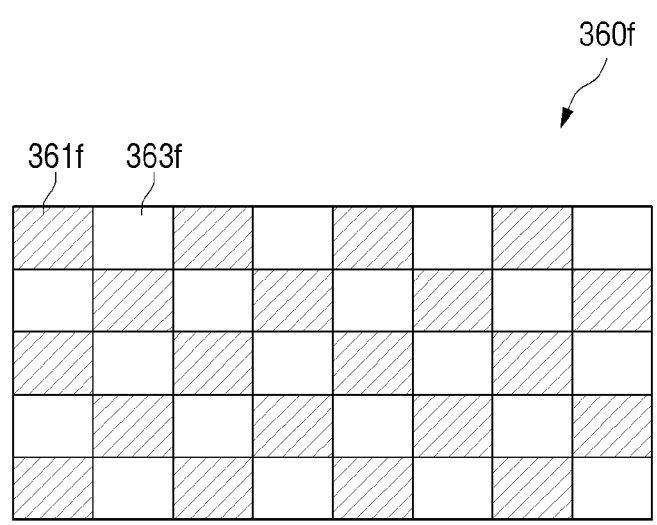

Referring to FIG. 23, a base layer 360f according to the present embodiment is different from the base layer 360 of FIG. 16 in that planar shapes of convex portions 361f and concave portions 363f are quadrilateral and an intermediate layer is omitted. Other descriptions have been described above with reference to FIGS. 16 and 17, and redundant descriptions will be omitted.

According to embodiments of the present disclosure, elongation rate and recovery rate can be improved in a cover window and a display device.

However, the effects of the embodiments are not restricted to the one set forth herein. The above and other effects of the embodiments will become more apparent to one of daily skill in the art to which the embodiments pertain by referencing the claims.

What is claimed is:

1. A stretchable window comprising:
   a first material extending in a first direction; and
   a second material extending in a second direction that intersects the first direction,
   wherein:
   the first material and the second material are interwoven,
   the first material has a first modulus, and
   the second material has a second modulus,
   wherein the first modulus has a value in a range of about 0.1 megapascals (Mpa) to about 500 Mpa and
   the second modulus has a value in a range of about 1 gigapascals (Gpa) to about 50 Gpa,
   wherein the first material includes at least one of polyurethane, or polyether block amide, and the second material includes polyimide.

2. The stretchable window of claim 1, wherein:
   the first material is provided in plural,
   the second material is provided in plural,
   the plurality of first materials are arranged along the second direction, and
   the plurality of second materials are arranged along the first direction.

3. The stretchable window of claim 2, wherein each of the plurality of first materials is interwoven with the plurality of second materials by passing over and under the plurality of second materials alternately.

4. The stretchable window of claim 3, wherein each of the plurality of second materials is interwoven with the plurality of first materials by passing over and under the plurality of first materials alternately.

5. The stretchable window of claim 1, wherein
   the first material has a first refractive index and
   the second material has a second refractive index,
   wherein a difference between the first refractive index and the second refractive index is about 0.01 or less.

6. The stretchable window of claim 5, wherein the first refractive index of the first material is in a range of about 1.5 to about 1.6.

7. The stretchable window of claim 5, wherein the second refractive index of the second material is in a range of about 1.55 to about 1.57.

8. The stretchable window of claim 1, wherein an elongation rate of the stretchable window along a first axis is about 50 percentages (%) or more.

9. The stretchable window of claim 1, wherein when the stretchable window is stretched equal to or less than about 50% along a first axis, an elongation rate along a second axis that is intersects the first axis is about 20% or more.

10. The stretchable window of claim 1, wherein
    the stretchable window has a first length in a first axis, and
    when a tensile force is applied to the stretchable window such that a length of the stretchable window in the first axis becomes twice the first length and maintained for 1000 seconds and then the tensile force is removed, a recovery rate of the stretchable window is about 90% or more.

11. The stretchable window of claim 10, wherein a light transmittance of the stretchable window at about 380 nanometers (nm) to about 580 nm is about 91% or more.

12. The stretchable window of claim 10, wherein a yellowness index of the stretchable window is about 0.5 or less.

13. A stretchable display device comprising:
a stretchable display panel; and
a cover window on the stretchable display panel, wherein
the cover window comprises:
  a first material extending in a first direction, and
  a second material extending in a second direction that intersects the first direction,
wherein the first material and the second material are interwoven, the first material has a first modulus, the second material has a second modulus, and the first modulus has a value in a range of about 0.1 Mpa to about 500 Mpa and the second modulus has a value in a range of about 1 Gpa to about 50 Gpa,
wherein the first material includes at least one of polyurethane, or polyether block amide, and the second material includes polyimide.

14. The stretchable display device of claim 13, wherein:
the first material has a first refractive index and
the second material has a second refractive index,
wherein a difference between the first refractive index and the second refractive index is about 0.01 or less.

15. The stretchable display device of claim 13, wherein when the cover window is stretched equal to or less than about 50% along a first axis, an elongation rate along a second axis that is intersects the first axis is about 20% or more.

16. The stretchable display device of claim 13, wherein the cover window has a first length in a first axis, and
when a tensile force is applied to the cover window such that a length of the cover window in the first axis becomes twice the first length and maintained for 1000 seconds and then the tensile force is removed, a recovery rate of the cover window is about 90% or more.

17. The stretchable display device of claim 13, wherein a light transmittance of the cover window at about 380 nm to about 580 nm is about 91% or more and a yellowness index of the cover window is about 0.5 or less.

18. A window comprising:
a base layer comprising an intermediate layer, convex portions protruding from the intermediate layer in a thickness direction, and concave portions recessed from the intermediate layer in the thickness direction,
wherein the base layer comprises a first material extending in a first direction and a second material extending in a second direction that intersects the first direction,
wherein the first material and the second material are interwoven, the first material has a first modulus, the second material has a second modulus, and the first modulus has a value in a range of about 0.1 Mpa to about 500 Mpa and the second modulus has a value in a range of about 1 Gpa to about 50 Gpa,
wherein the first material includes at least one of polyurethane, or polyether block amide, and the second material includes polyimide.

19. The window of claim 18, further comprising:
a first planarization layer disposed on an upper portion of the base layer; and
a second planarization layer disposed on a lower portion of the base layer,
wherein a difference in refractive index between the first planarization layer and the base layer is about 0.01 or less, and a difference in refractive index between the second planarization layer and the base layer is about 0.01 or less.

20. The window of claim 19, wherein a modulus of each of the first planarization layer and the second planarization layer is in a range of about 0.05 Mpa to about 500 Mpa.

21. The window of claim 18, wherein the first modulus has a value in a range of about 0.1 Mpa to about 500 Mpa and the second modulus has a value in a range of about 1 Gpa to about 50 Gpa.

22. The window of claim 18, wherein the convex portions and the concave portions are arranged alternately in a plan view.

* * * * *